United States Patent
Kim et al.

(10) Patent No.: US 7,720,888 B2
(45) Date of Patent: May 18, 2010

(54) CONTENTS CONVERSION COMMUNICATION TERMINAL, SERVER SYSTEM, AND METHOD

(75) Inventors: Woo-Sik Kim, Incheon (KR); Do-Hyung Kim, Daejeon (KR); Sun-Ja Kim, Daejeon (KR); Heung-Nam Kim, Daejeon (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 292 days.

(21) Appl. No.: 11/288,811

(22) Filed: Nov. 28, 2005

(65) Prior Publication Data
US 2006/0123064 A1    Jun. 8, 2006

(30) Foreign Application Priority Data
Dec. 8, 2004    (KR) .................. 10-2004-0103037
Aug. 26, 2005   (KR) .................. 10-2005-0078621

(51) Int. Cl.
*G06F 12/00* (2006.01)
*G06F 17/00* (2006.01)
(52) U.S. Cl. ............... 707/809; 707/803; 707/804; 707/828
(58) Field of Classification Search .......... 707/201–204
See application file for complete search history.

(56) References Cited

U.S. PATENT DOCUMENTS

| | | | | |
|---|---|---|---|---|
| 5,864,853 A | * | 1/1999 | Kimura et al. ............... | 707/10 |
| 6,766,296 B1 | * | 7/2004 | Adachi ..................... | 704/246 |
| 7,027,836 B2 | * | 4/2006 | Zacks et al. ............... | 455/557 |
| 7,072,939 B1 | * | 7/2006 | Amro et al. ................ | 709/204 |
| 2002/0095433 A1 | * | 7/2002 | Inohara et al. ............. | 707/200 |
| 2002/0099829 A1 | * | 7/2002 | Richards et al. ............ | 709/227 |
| 2002/0113817 A1 | * | 8/2002 | Mitsugi ................... | 345/744 |
| 2003/0009567 A1 | * | 1/2003 | Farouk .................... | 709/229 |
| 2003/0177251 A1 | * | 9/2003 | Suzuki et al. .............. | 709/229 |
| 2004/0029552 A1 | * | 2/2004 | Miki et al. ................ | 455/344 |
| 2004/0183828 A1 | * | 9/2004 | Nichogi et al. ............. | 345/745 |
| 2006/0036940 A1 | * | 2/2006 | Hsiu-Ping et al. ........... | 715/513 |

* cited by examiner

*Primary Examiner*—Etienne P LeRoux
*Assistant Examiner*—Cindy Nguyen
(74) *Attorney, Agent, or Firm*—Blakely, Sokoloff, Taylor & Zafman LLP

(57) ABSTRACT

A contents conversion communication terminal, a contents conversion supporting server system, and a contents conversion supporting method are provided. In a protocol structure of the communication terminal, a distribution file system layer supports a server system and at least one other communication terminal connected through a network to share a data file therebetween, an adaptation layer performs a contents conversion to use a data file in the communication terminal, the adaptation layer being placed on the distribution file system layer, and a virtual file system layer receives a system call message and transmits the system call message to the adaptation layer, the virtual file system layer being placed on the adaptation layer.

5 Claims, 6 Drawing Sheets

Communication Terminal        Server System

Communication Terminal

Server System

CONTENTS CONVERSION COMMUNICATION TERMINAL, SERVER SYSTEM, AND METHOD

BACKGROUND OF THE INVENTION (a) Field of the Invention

The present invention relates to a contents conversion communication terminal, a contents conversion server system, and a contents conversion method. More particularly, the present invention relates to a contents conversion communication terminal, a contents conversion server system, and a contents conversion method capable of supporting various terminals to share the contents stored at one server system.

(b) Description of the Related Art

Generally, one communication terminal has one file system for processing a system call of applications thereof and for providing data, a so called local file system. The local file system can be used for a corresponding communication terminal, and can store files at a storing apparatus physically connected with the corresponding communication terminal. The local file system has drawbacks in that it loses all the stored data when the storing apparatus has a failure, and it cannot share the stored data with other communication terminals.

Accordingly, it has become necessary to be able to share the stored data between communication terminals, as various personal communication terminals have been developed forming various network environments, and the functions of the communication terminals have become more complicated. Particularly, since resources are severely wasted in linked server systems, as well as in the communication terminals, when the same contents are stored at the various media files, as the wired/wireless Internet population has explosively increased, various media files, such as MPEG-4 and ASF, have appeared, and storage has increased due to the respective access devices requiring high resolution and various quality. Accordingly, data sharing and synchronization technology have been desired, and data conversion technology has been developed to adapt data appropriately for respective communication terminals.

Recently, Microsoft has developed a roaming profile technology to share personal data with a desktop computer. When any desktop computer is accessed among desktop computers grouped in one domain, the roaming profile technology allows the accessed desktop computer to access personal data. However, the roaming profile technology can only be used when the desktop computer installs a windows program thereon. Accordingly, the roaming profile technology is limited by file sharing environments so that it is difficult to be adapted to mobile terminals having various software environments, hardware environments, and communication environments. Therefore, it is desired to provide a data synchronization service and a sharing service according to characteristics of the communication terminals, and it is also desired to convert data to an optimum format which the communication terminals can all use.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a contents conversion communication terminal, a contents conversion supporting server system, and a contents conversion supporting method having advantages of supporting a contents conversion such that various communication terminals can easily share the stored files of the server system.

In addition, the present invention has been made in an effort to provide a contents conversion communication terminal, a contents conversion supporting server system, and a contents conversion supporting method having advantages of adapting contents according to characteristics of the communication terminals. An exemplary protocol structure of a contents conversion communication apparatus according to an embodiment of the present invention includes: a distribution file system layer for supporting a server system and at least one other communication terminal connected through a network to share a data file therebetween; an adaptation layer for performing a contents conversion to use a data file in the communication terminal, the adaptation layer being placed on the distribution file system layer; and a virtual file system layer for receiving a system call message and transmitting the system call message to the adaptation layer, the virtual file system layer being placed on the adaptation layer.

An exemplary contents conversion communication terminal according to another embodiment of the present invention includes: a distribution file system layer for supporting a server system and at least one other communication terminal connected through a network to share a data file therebetween; an adaptation layer for performing a contents conversion to use a data file in the communication terminal, the adaptation layer being placed on the distribution file system layer; and a virtual file system layer for receiving a system call message and transmitting the system call message to the adaptation layer, the virtual file system layer being placed on the adaptation layer.

An exemplary contents conversion method of a server system sharing a data file with at least one communication terminal connected through a network according to another embodiment of the present invention includes generating a mount point based on a distribution file system for the at least one communication terminal, receiving a data file transmission request through the mount point from the communication terminal, determining whether the communication terminal is established to perform a contents conversion based on the communication terminal information, converting contents of the data file in the case of not being established and transmitting the converted data file to the communication terminal, and storing the data file and the conversion information thereof and sharing files of other communication terminals.

An exemplary contents conversion method of a server system sharing a data file with at least one communication terminal connected through a network according to another embodiment of the present invention includes receiving an available file list and corresponding file access path information from the server system, transmitting the data file through the received file access path, performing a contents conversion for the received data file, and transmitting the converted data file to the server system.

DETAILED DESCRIPTION OF THE EMBODIMENTS

Figure 1:
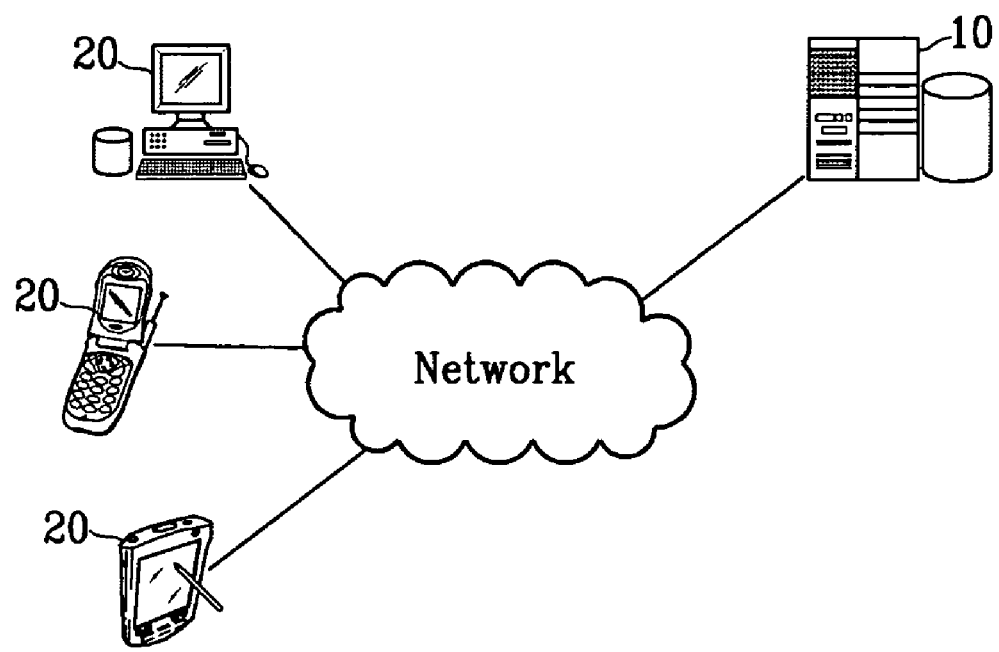
FIG. 1 is a schematic view showing a network in which communication terminals are linked with a server system according to an exemplary embodiment of the present invention.

Exemplary embodiments of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

In addition, the term "module" means the block built for conversion or plug-in of the hardware or software system. That is, it means a unit or a block for executing a particular function in the hardware or software. The term "contents" indicates various data files, such as an image file, a document file, and a moving image file, which a server system and communication terminals will share.

Now, a contents conversion communication terminal, a contents conversion supporting server system, and a contents conversion supporting method according to an exemplary embodiment of the present invention will be described with reference to the accompanying drawings.

FIG. 1 is a schematic view showing a network in which communication terminals are linked with a server system according to an exemplary embodiment of the present invention.

As shown in FIG. 1, a communication terminal 20 according to an exemplary embodiment of the present invention is connected with a server system 10 through a wireless personal area network (WPAN), a wireless local area network (WLAN), a third generation wireless communication network, a wireless portable Internet system, a wireless broadband Internet (WiBro), and other wireless communication networks. The server system 10 and the communication terminal 20 have physically different systems connected through a network and have the same protocol structure based on a distributed file system (DFS) providing a file access space. The file access spaces appear to be the same. The communication terminal 20 may include a cellular phone, a laptop computer, a desktop computer, and a personal digital assistant (PDA). However, the server system 10 may simply store and share a file using a protocol structure excluding an application layer in FIG. 2.

Figure 2:
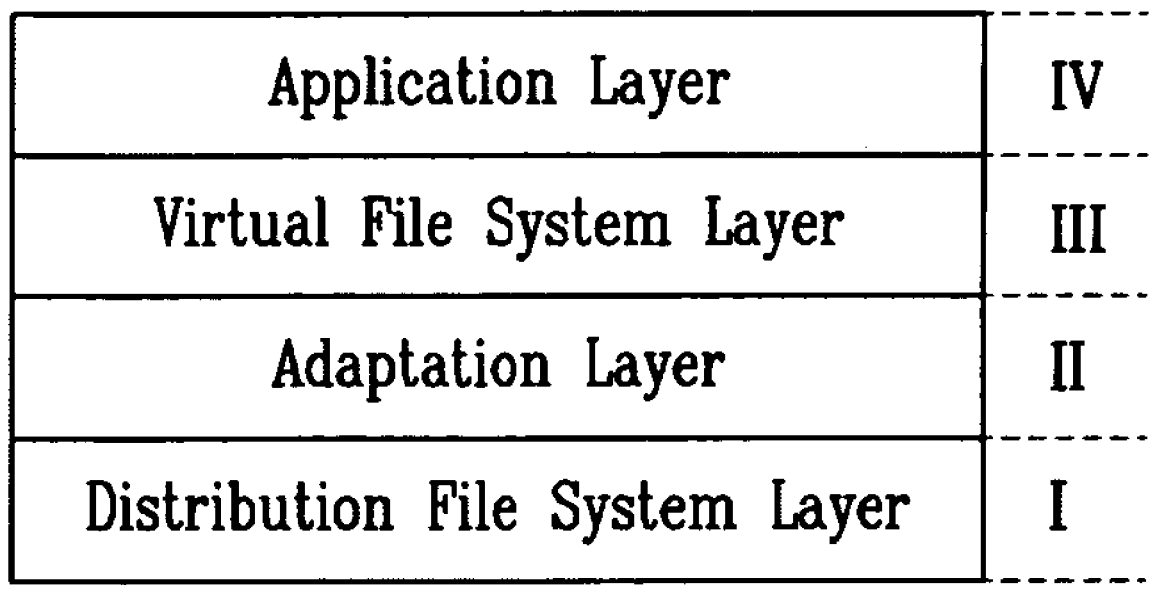
FIG. 2 is a block diagram showing a configuration of a protocol used in a communication terminal and a server system according to an exemplary embodiment of the present invention.

FIG. 2 is a block diagram showing a configuration of a protocol used in communication terminals and a server system according to an exemplary embodiment of the present invention. As shown in FIG. 2, a protocol according to an exemplary embodiment of the present invention includes a distribution file system layer, an adaptation layer, a virtual file system layer, and an application layer.

The distribution file system layer connects physically different terminals through a network, and employs a DFS technology for sharing and synchronizing data. In addition, the distribution file system level accommodates various file system drivers (not shown) for providing a service to users. The distribution file system layer supports contents sharing between a plurality of communication terminals and a server system. Accordingly, the distribution file system layer supports a user authentication and a data encryption such that the authenticated communication terminals or user can access contents. For example, in order to verify authenticated communication terminals or users, the distribution file system layer provides a specific ID for all the communication terminals and users, or uses encrypted passwords. In addition, the distribution file system layer establishes and sorts how much authority the specific communication terminal or user has for any file or directory.

In addition, the distribution file system layer supports a disconnected operation such that the communication terminal can access resources usually accessible only if connected even when the communication terminal has been disconnected from the network. For this end, the communication terminal copies and stores the resources to be worked on from the server when in a connection situation and updates the worked resources on the server when in a reconnection situation. The plurality of communication terminals and the server system can achieve sharing data consistency through such processes.

The adaptation layer adapts the contents appropriately to the characteristics of the communication terminals 20, the communication network presently connected to the communication terminal, and the user, so that the respective communication terminals use optimized contents in a real time. The adaptation layer processes contents conversion data while interrupting all system calls accessible to the distribution file system layer and transmits the processed contents conversion data to the distribution file system layer. The adaptation layer will be described in more detail with reference to FIG. 3.

The virtual file system layer interfaces all system calls from the application layer to the adaptation layer section. The virtual file system layer helps to differently realize work on the various operating systems by vitalizing the work between the distribution file system layer and the operating system. The virtual file system layer allows the user and the process to use any file without perceiving whether the file is included in any file system. That is, when all file systems including a floppy disk and a CD-ROM are requested to be used, such a request is transmitted to the virtual file system layer and the virtual file system layer transmits the request to an appropriate file system driver in the distribution file system layer. According to an exemplary embodiment of the present invention, such system calls are transmitted from the virtual file system layer through the adaptation layer to the distribution file system layer.

The application layer includes various application supporting protocols and a specific service program. In this case, various application programs may include an MP3 regenerator, an image viewer, and an image communication program.

Figure 3:
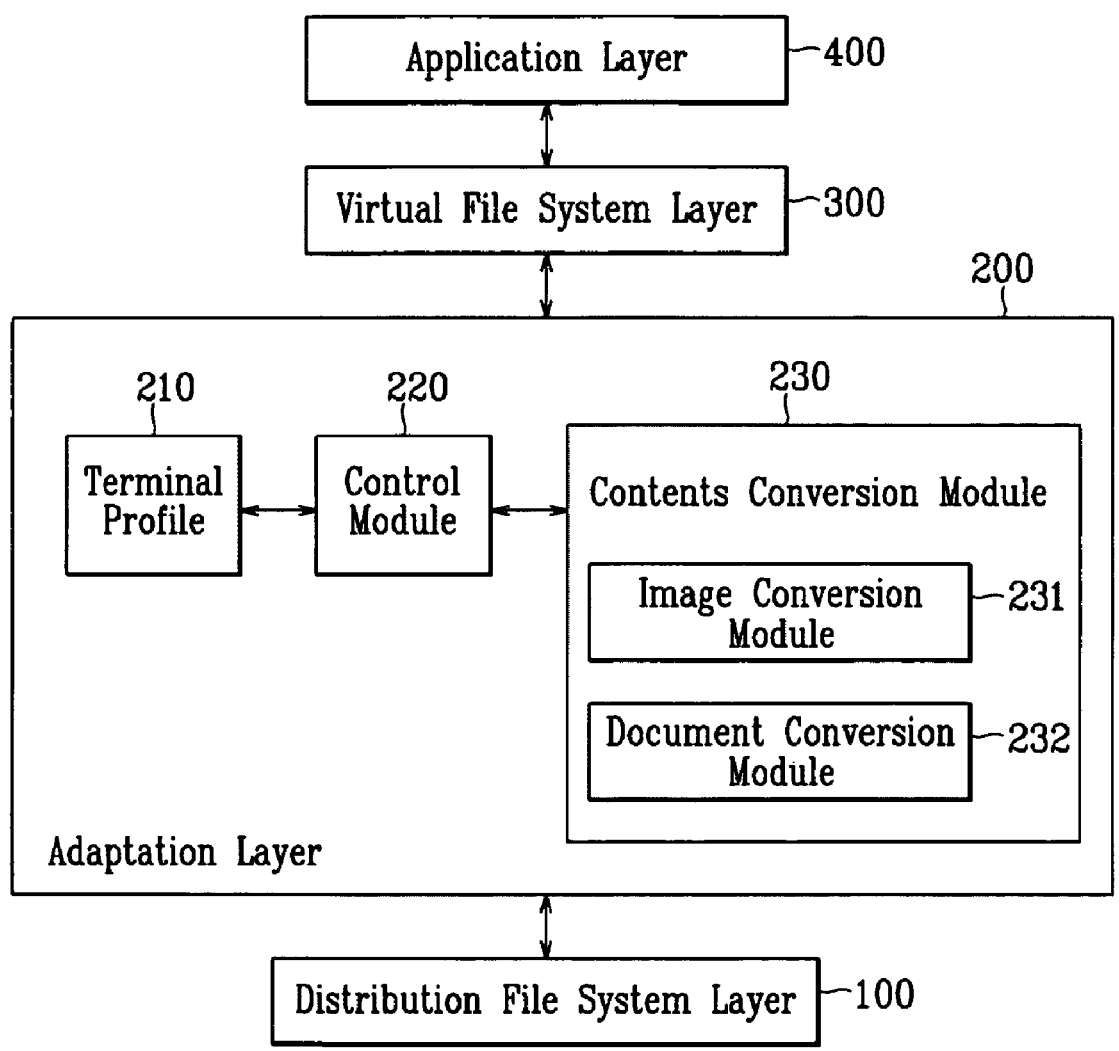
FIG. 3 is a block diagram showing a configuration of a communication terminal and a server system loading a protocol structure according to an exemplary embodiment of the present invention.

FIG. 3 is a block diagram showing a configuration of a communication terminal and a server system loading a protocol structure according to an exemplary embodiment of the present invention. As shown in FIG. 3, the communication terminal and server system according to an exemplary embodiment of the present invention includes a distribution file system layer 100, an adaptation layer 200, a virtual file system layer 300, and an application layer 400 respectively realizing the protocols.

The distribution file system layer 100, the virtual file system layer 300, and application layer 400 respectively have been described with reference to FIG. 2. Accordingly they will not be described again here for convenience of description.

In addition, as shown in FIG. 3, the adaptation layer 200 includes a terminal profile 210, a controlling module 220, and a contents conversion module 230. The contents conversion module 230 includes an image conversion unit 231 and a document conversion unit 232.

The terminal profile 210 stores information on the communication terminal 20. The terminal profile 210 stores the information allocated at the communication terminal 20 for data communication. The information may include an IP address allocated at the communication terminal 20, a user ID of the communication terminal 20, and a group ID of the corresponding user therein. In addition, the terminal profile 210 stores hardware information including display size, resolution, supporting color, a clock of a central processing unit (CPU), memory information, and sound card specifications thereof. In addition, the terminal profile 210 stores the communication network presently connected to the communication terminal access information, including type of communication network, bit data rate of the contents, valuable channel bandwidth, data transmission error rate, and information of the converting units 231 and 232 included in the converting module 230. The terminal profile 210 stores software information including title/version information of the application program installed in the communication terminal 20 and Codec information.

In the communication terminal 20, the terminal profile 210 stores such information such that it transmits such information to the server system 10 on the generation of a mount point by the control of the controlling module 220. When the server system 10 receives such information, the server system 10 stores the communication terminal information at the terminal profile 210 of the protocol structure while sorting such information for the respective communication terminals 20. And then the server system 10 uses the stored information for contents conversion. In this case, the communication network information is often changed in comparison with the other information concerning the communication terminal 20. Accordingly, the communication terminal 20 must periodically update the information on the communication network stored at the terminal profile 210.

The controlling module 220 receives various file/directory system calls, which occur at the application layer 400 and are transmitted through the virtual file system layer 300, so that it controls a data process for the contents conversion. The controlling module 220 serves as an interface of the distribution file system layer 100 and simultaneously transmits contents of the corresponding system calls to the contents conversion module 230 so that it controls an operation process requested by the application layer 400. In addition, the controlling module 220 calls the conversion unit 231 and 232 for converting the contents received from the server system 10 in an optimum form applicable to the communication terminal 20 such that the contents are converted to an applicable form according to a request of the communication terminal 20. That is, when the application layer 400 transmits a system call for requesting an image viewer to be driven, the controlling module 220 calls the image conversion unit 232 and controls the contents to be converted.

The contents conversion module 230 converts the contents into an appropriate format, which the communication terminal 20 can use with reference to the terminal profile 210. In the contents conversion module 230, the image conversion unit 231 and the document conversion unit 232 directly convert the contents, and the adaptation layer 200 exchanges cross information in both of the server system 10 and the communication terminal 20 so that the contents are converted into the appropriate format.

That is, the server system 10 receives an image file transmission request message from the communication terminal 20, determines whether the corresponding image file will be applicable to the communication terminal 20 based on the terminal information received from the communication terminal 20. If not applicable, in the server system 10, the controlling module 220 exchanges a resource access request message, a resource variation request message, and a resource transmission request message with the contents conversion module 230 to call the conversion unit 231 such that the corresponding image file is converted into the appropriate format applicable to the communication terminal 20.

The image conversion unit 231 changes images based on a display size, a supporting color, and a resolution information of the communication terminal 20 and image data format information capable of being displayed on the communication terminal 20 among the information stored at the terminal profile 210. In this case, state information of a communication channel with which the communication terminal 20 is presently connected, may be further used.

The document conversion unit 232 converts the document into the appropriate form based on document data format information to be displayed on the communication terminal 20 and application program information among the information stored at the terminal profile 210. In this case, state information of a communication channel with which the communication terminal 20 is presently connected, may be further used.

In this embodiment, it is exemplarily shown that the contents conversion module 230 includes the image conversion unit 231 and the document conversion unit 232. However, it should be understood that the server system 10 can transmit the conversion unit for the application service which uses the contents requested by the communication terminal 20, the communication unit receives the conversion unit and installs the conversion unit at the contents conversion module 230 in the protocol structure so that the conversion unit is used for the next contents conversion.

Figure 4:
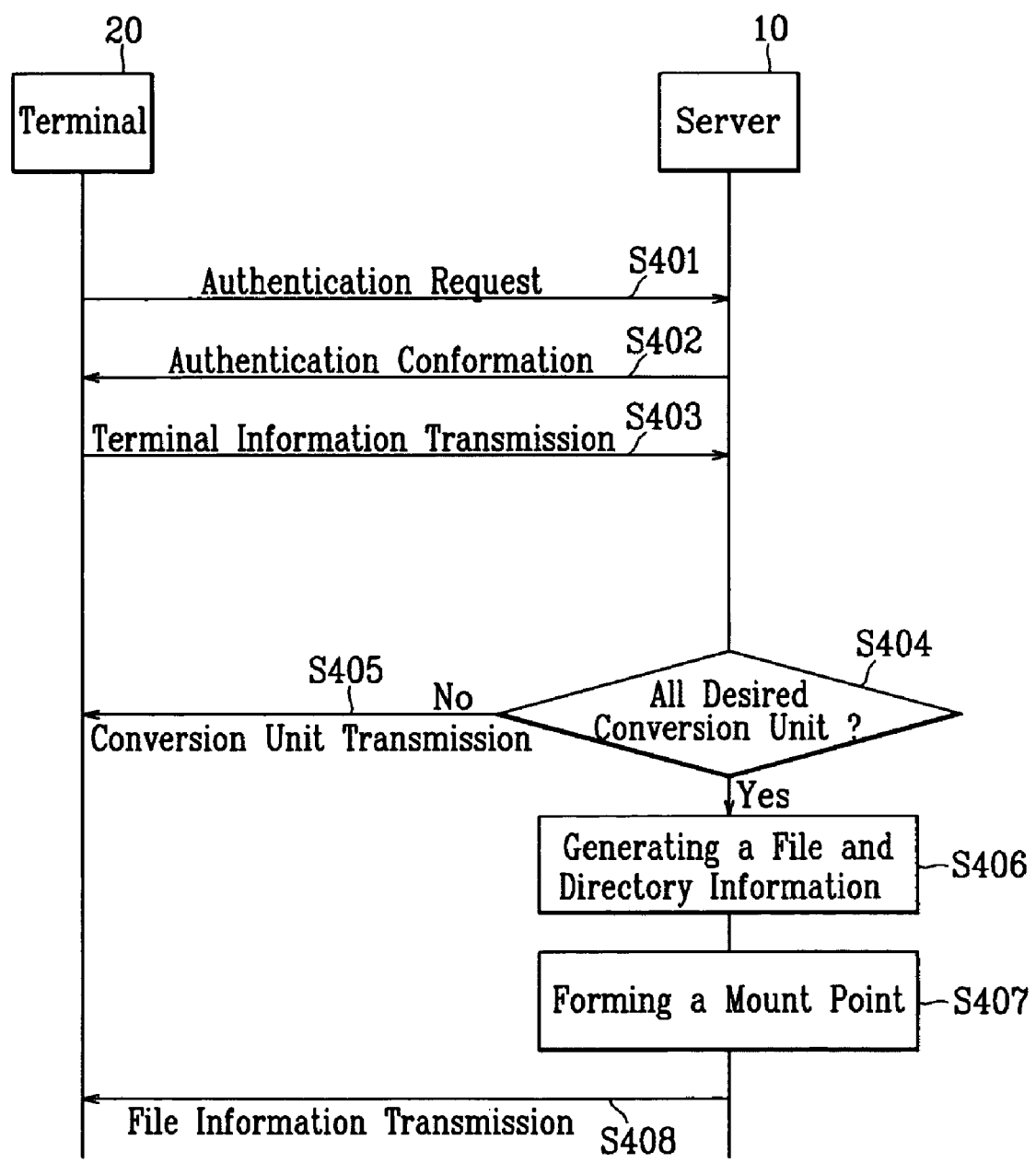
FIG. 4 is a flowchart showing a mount process for providing contents according to an exemplary embodiment of the present invention.

FIG. 4 is a flowchart showing a mount process for providing contents according to an exemplary embodiment of the present invention. As shown in FIG. 1, when the server system 10 and the plurality of communication terminals 20 having the same protocol structure based on the distribution file system are connected with each other through the network, a mount process for generating a mounting point, that is, a path which the respective communication terminals 20 have access to contents stored at other communication terminals 20 or a server system 10, must be previously performed, so as to share and synchronize contents stored at the respective communication subjects 10 and 20.

In order to access the contents stored at the server system 10, the communication terminal 20 requests a server system authentication (S401).

The server system 10 verifies whether the communication terminal 20 has the authority to access the contents stored at the server system 10 based on the information stored at the terminal profile 210 in the protocol. The server system 10 verifies an authority of the communication terminal 20 by a user authentication and a group authentication and determines whether there is a mounting point for generating a path so as to share a file (S402). Such processes are performed in the distribution file system layer 100 among the protocol structure of the server system 10.

When the communication terminal 20 receives an authentication finish signal from the server system 10, the communication terminal 20 transmits the hardware information, software information, and application program information concerning the communication terminals stored at the terminal profile 210 to the server system 10 (S403). The server system 10 receives this information, sorts and stores the same for the respective communication terminals connected through the same distribution file system at the terminal profile 210 in the adaptation layer 200.

The server system 10 determines whether there are all the desired conversion units for converting the contents according to the communication terminal request message based on the application program information and the installed conversion unit information among the information that is received from the respective communication terminals 20 and stored at the terminal profile 210 (S404).

When at least one desired conversion unit is not found, the server system 10 transmits the unfound conversion unit to the corresponding communication terminal 20 (S405). The transmitted conversion unit is installed in the communication terminal 20, applied in the internal protocol structure so that the contents conversion is prepared. In this case, since information of the contents conversion module 230 is changed in the communication terminal 20, the server system 10 updates the information of the corresponding communication terminal 20 stored at the terminal profile 210.

When the communication terminal 20 has installed the contents conversion modules, the server system 10 performs a filtering so as to select the file capable of being supported by the corresponding communication terminal 20 from among the entire data file information which the communication terminals 20 can share. The server system 10 generates a file list and directory information thereof which the communication terminal 20 can use as a result of the filtering (S406). For example, when a cellular phone has an MP3 player function, the server system 10 extracts MP3 files stored at the internal storing unit, generates a list thereof, and matches the listed MP3 files with the directory information of the files.

Based on the file list and directory information, the server system 10 generates a mount point by a directory index indicating a file access path, and transmits the mount point to the communication terminal 20 (S407, S408). The server system 10 and communication terminal 20 employs the distribution file system based protocol structure. Accordingly, when one communication subject 10 or 20 will access the contents stored at another communication subject 10 or 20, the directory name is generated according to a given rule through the processes as shown in FIG. 4 and the mount point is generated through the data processing in which the contents stored at the server system 10 is perceived as the contents stored at the corresponding communication terminal 20.

A file system driver in the protocol structure of the communication terminal 20 processes the information transmitted through the mount point to the communication terminal 20 and provides the processed information to the user.

In this embodiment, it is exemplarily described that the transmission of the conversion module is transmitted according to the request of the communication terminal 20 before the filtering. However, it should be understood that the server system 10 may determine whether the conversion unit included in the list is installed based on the information stored at the terminal profile 210 after the filtering process for extracting a contents list available at the corresponding communication terminal 20 and transmits the desired conversion units to the communication terminal 20. In addition, the server system 10 may transmit the desired contents conversion module for providing the optimum content to the communication terminal 20 when the communication terminal 20 requests a file transmission after the generation of the mount point.

In the mount process as shown in FIG. 4, the server system 10 transmits the file list and the directory list to the communication terminal 20, and then the server system 10 transmits a file copy to the communication terminal 20 on the substantial accessing of the communication terminal 20 to a specific file so that the communication terminal 20 performs the contents conversion. According to an exemplary embodiment of the present invention, the contents conversion may be processed by two schemes: in the case of the accessing to the file in a read only mode without changing the access file, and in the case of the accessing to the file in a write mode in which the communication terminal 20 can change the access file. At this time, the communication subjects may be changed.

Figure 5:
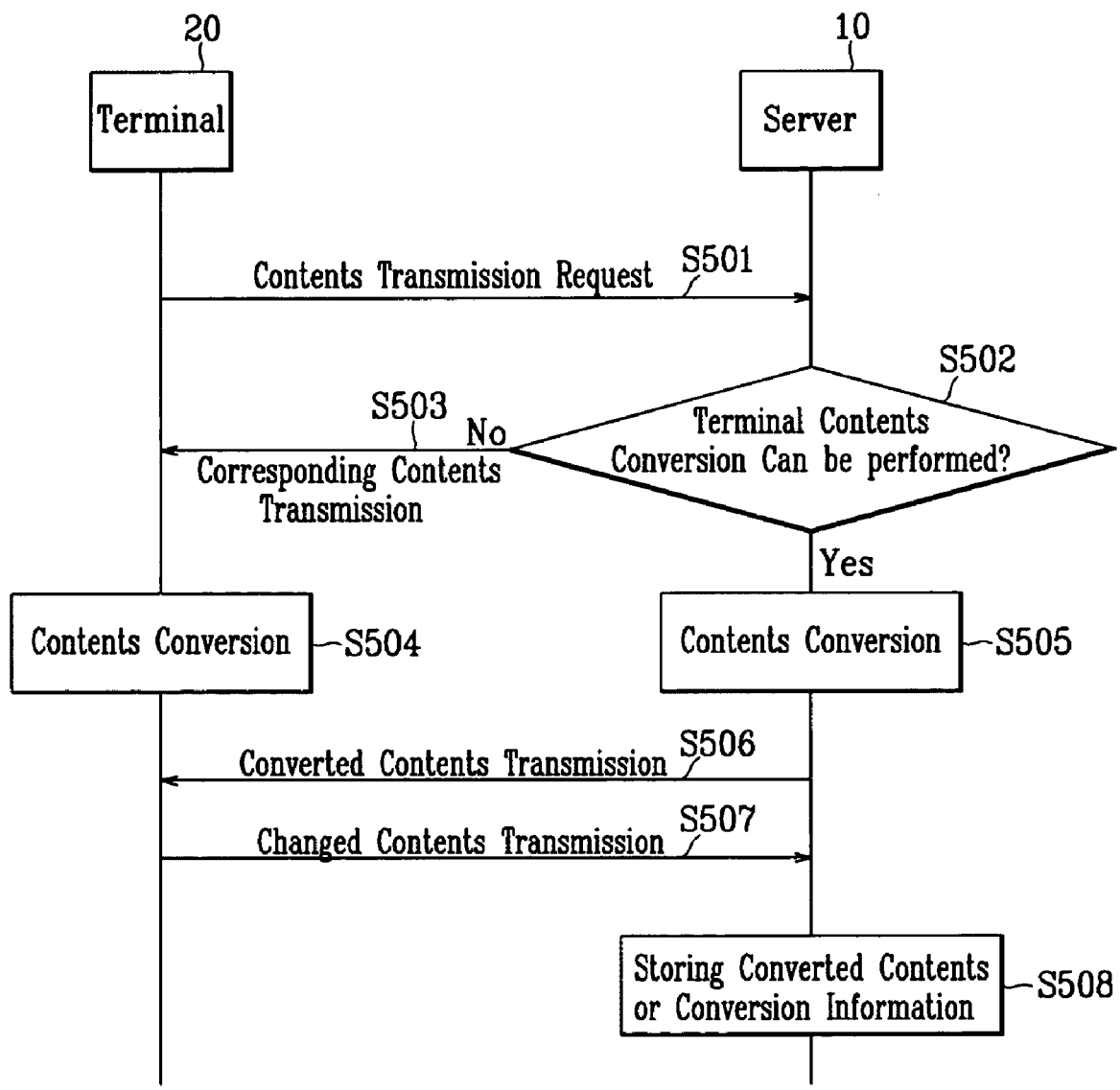
FIG. 5 is a flowchart showing a contents conversion process according to an exemplary embodiment of the present invention.

Now, how the communication terminals 20 and the server system 10 convert contents according to an exemplary embodiment of the present invention will be described with reference to FIG. 5. FIG. 5 is a flowchart showing a contents conversion process according to an exemplary embodiment of the present invention.

As shown in FIG. 5, when the user selects a specific file from the file and directory list received by the mount process and displayed on the communication terminal 20, the communication terminal 20 transmits the contents transmission request signal to the server system 10 (S501).

When the server system receives the contents transmission request signal, the server system 10 determines whether the corresponding communication terminal 20 can achieve a contents conversion (S502) with reference to the terminal profile 210 in the protocol structure. That is, the server system 10 determines whether the file access scheme is established in a write mode in the communication terminal 20. At this time, even when the communication terminal 20 is established in the write mode, the communication terminal 20 can request the server system 10 to transmit the contents without the contents conversion.

When the communication terminal 20 can achieve the contents conversion, the server system 10 transmits a copy of the file stored at the memory without the contents conversion (S503).

When the communication terminal 20 cannot achieve the contents conversion, that is, is established in a read mode, the server system 10 performs a contents conversion based on the terminal information received by the mount process and stored at the terminal profile 210 and transmits the contents conversion to the communication terminal (S504, S506). The server system 10 performs the contents conversion such that the communication terminal 20 uses the file in the optimum form without a resource waste based on hardware specification information of the communication terminals 20 and the communication network information, etc. For example, in the case of an image file, the server system 10 controls the original image considering the display resolution and the number of the supporting colors of the communication terminal 20 and transmits the controlled image. In the case of a moving image file, the server system 10 changes a display resolution, a supporting color, a replay speed, and an encoding scheme, etc., and transmits the changed image file to the communication terminal 20. On the transmitting of the moving image file, if necessary, the moving image file may be transmitted in stream form according to the hardware specification of the communication terminal 20.

At this time, the server system 10 may change the encoding scheme or the file memory based on bandwidth information, transmission bit ratio information, and transmission error ratio information of the communication network with which the communication terminal 20 is presently connected. For example, for the communication terminals 20 previously connected with the WiBro network so as to be connected with the code division multiple access network (CDMA network) due to the changing of the user position, the server system performs a conversion for lowering the image quality or voice quality of the corresponding contents considering the bandwidth difference of the two networks so that it can transmit the converted contents to the communication terminal 20. The server system 10 stores the contents conversion concerning information along with the corresponding file as a conversion history.

When the communication terminal 20 can perform a contents conversion, that is, is established in a write mode, the communication terminal 20 directly performs the contents conversion using the copy of the file transmitted from the server system 10 (S505). The communication terminal 20 calls the conversion units 231 and 232 appropriate to the form of the received file through the adaptation layer 200 so that the conversion units 231 and 232 directly perform the contents conversion based on the information of the terminal profile 210. The contents conversion data process performed at the communication terminal 20 is the same as that of the server system 10. In this case, since the contents conversion is achieved after the server system 10 transmits the contents, the information concerning the communication network, with which the communication terminal 20 is presently connected, may not be used.

When the communication terminal 20 performs the contents conversion process, the communication terminal transmits the file changing information to the server system 10 (S507), and the server system 10 performs a contents conversion for the corresponding file using the transmitted changing information or the transmitted changing information stored as a conversion history, along with the corresponding file (S508).

Figure 6:
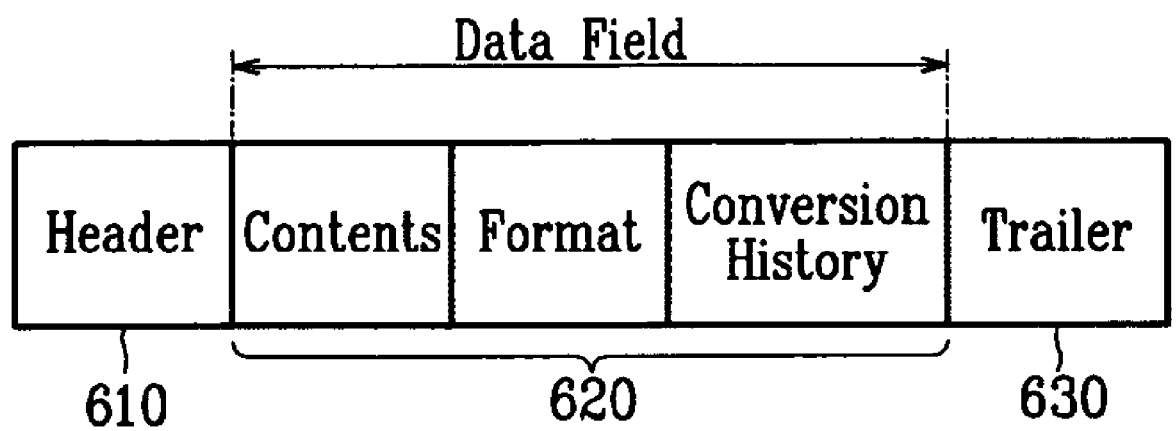
FIG. 6 is a block diagram schematically showing a data frame generated by a contents conversion process according to an exemplary embodiment of the present invention.

FIG. 6 is a block diagram schematically showing a data frame generated by a contents conversion process according to an exemplary embodiment of the present invention.

The server system 10 or the communication terminals 20 must change the exchanged data frame format therebetween such that the server system 10 or the communication terminals 20 share the changed data file with other communication terminals 20 connected through the network having the same protocol structure. For this end, a contents conversion file has a data frame format as shown in FIG. 6.

The data frame includes a header 610 having application program information for supporting the contents conversion file along with an address field. The data frame also includes a trailer 630 corresponding to the end of the data frame, which may include information for checking an error at the server system 10 and communication terminal 20.

The data frame further includes a data field 620 including a content, a format, and a file conversion history. The content implies what the corresponding file transmits. The format implies structure information expressed as a detailed file format for expressing the content. For example, in the case of a word file, DOC type is the format and the words expressed by the DOC type are the content. The content and format may not be previously established and may be changed based on the result of the contents conversion according to the combination of the converted file type and the communication terminal 20.

The conversion history stores the information concerning the contents conversion performed at the server system 10 or communication terminal 20. For example, when a document of the DOC format is transmitted to the communication terminal 20 supporting only the TXT format and the communication terminal 20 performs the contents conversion of the document, the file format changing information from the DOC format to the TXT format is included in the conversion history and transmitted to the server system 10. The server system 10 performs the file changing by performing the same conversion for contents stored at the memory based on the conversion history information included in the received data frame.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to an exemplary embodiment of the present invention, an automatic contents conversion can be performed according to characteristics of the communication terminals, and also it is desired to convert data to an optimum format in which the various communication terminals having the same protocol can easily share the converted contents.

In addition, according to an exemplary embodiment of the present invention, optimized contents can be generated in a real time without changing the upper layer by employing a protocol structure having a separate layer for performing a contents conversion.

What is claimed is:

1. A contents conversion method of a server system sharing a data file with at least one communication terminal connected through a network, comprising:
   generating a mount point, based on a distribution file system, for the at least one communication terminal, wherein generating the mount point includes:
   performing an authentication for the communication terminal;
   receiving at least one type of information among terminal ID information, hardware information, software information, and communication network information from the communication terminal;
   generating a list of data files accessible to the communication terminal and a list of directories stored at the corresponding file based on the received terminal information; and
   generating a data file access path by linking the generated list with one directory in the server system and transmitting the list and the access path information to the communication terminal;
   receiving a data file transmission request through the mount point from the communication terminal;
   determining whether the communication terminal is established to perform a contents conversion based on the communication terminal information;
   transmitting a copy of the data file to the communication terminal so that the communication terminal performs a contents conversion in the case of the communication terminal being suitably established to perform the contents conversion;

converting contents for the data file for visual optimization at the communication terminal based at least in part on a display size and resolution of the communication terminal;

transmitting the converted data file to the communication terminal in the case of the communication terminal not being established to perform the contents conversion; and storing the data file and the conversion information thereof and sharing files of other communication terminals.

2. The contents conversion method of claim 1, wherein the server system performs the data file conversion based on the hardware and software information of the corresponding communication terminal which requests a data file transmission.

3. The contents conversion method of claim 1, wherein the server system performs the data file conversion based on at least one information among type, available channel bandwidth, and data error rate information concerning the communication network with which the communication terminal is connected.

4. The contents conversion method of claim 1, further comprising extracting desired conversion unit information for converting contents based on the communication terminal information and transmitting the corresponding conversion unit to the communication terminal.

5. The contents conversion method of claim 1, further comprising receiving the contents conversion result from the communication terminal and storing the contents conversion result at the server system.

* * * * *